(12) United States Patent
Li et al.

(10) Patent No.: US 8,396,263 B2
(45) Date of Patent: Mar. 12, 2013

(54) METHOD, APPARATUS AND COMPUTER PROGRAM PRODUCT FOR PROVIDING FACE POSE ESTIMATION

(75) Inventors: Jiangwei Li, Beijing (CN); Kongqiao Wang, Beijing (CN); Lei Xu, Beijing (CN)

(73) Assignee: Nokia Corporation, Espoo (FI)

( * ) Notice: Subject to any disclaimer, the term of this patent is extended or adjusted under 35 U.S.C. 154(b) by 971 days.

(21) Appl. No.: 12/346,158

(22) Filed: Dec. 30, 2008

(65) Prior Publication Data

US 2010/0166317 A1   Jul. 1, 2010

(51) Int. Cl.
*G06K 9/00* (2006.01)
(52) U.S. Cl. .................................. 382/118; 382/228
(58) Field of Classification Search .................. 382/118, 382/209, 228
See application file for complete search history.

(56) References Cited

U.S. PATENT DOCUMENTS

| | | | | |
|---|---|---|---|---|
| 5,497,430 | A * | 3/1996 | Sadovnik et al. | 382/156 |
| 6,940,545 | B1 * | 9/2005 | Ray et al. | 348/222.1 |
| 7,099,505 | B2 * | 8/2006 | Li et al. | 382/159 |
| 2005/0013479 | A1 * | 1/2005 | Xiao et al. | 382/159 |
| 2006/0120572 | A1 * | 6/2006 | Li et al. | 382/118 |
| 2006/0120604 | A1 * | 6/2006 | Kim et al. | 382/181 |
| 2008/0187186 | A1 | 8/2008 | Togashi | |

FOREIGN PATENT DOCUMENTS

| | | |
|---|---|---|
| EP | 1 772 816 A1 | 4/2007 |
| JP | 2007-109229 A | 4/2007 |
| JP | 2008-021266 | 1/2008 |
| JP | 2008-191816 | 8/2008 |

OTHER PUBLICATIONS

International Search Report and favorable Written Opinion for International Application No. PCT/IB2009/007744 completed Apr. 6, 2010.
Ma Y., et al.; "Real-Time Multi-View Face Detection and Pose Estimation Based on Cost-Sensitive AdaBoost"; Tsinghua University Press; Beijing, China; vol. 10; nr. 2; pp. 152-157; ISSN 1007-0214; pp. 153-155; figure 3; abstract.
Vajda T., et al.; "General framework for human object detection and pose estimation in video sequences"; 5th IEEE International Conference on Industrial Informatics; 2007; IEEE; Piscataway, NJ, USA; pp. 467-472; ISBN 978-1-4244-0850-4; Section III; figure 2; abstract.
*Statistical Learning of Multi-View Face Detection*, Li, S. et al., Proceeding of European Conference on Computer Vision, 2002.
*Learning Multiview Face Subspaces and Facial Pose Estimation Using Independent Component Analysis*, Li, S. et al., IEEE Transaction on Image Processing, 2005, 14(6), Jun. 2005, pp. 705-712.

(Continued)

*Primary Examiner* — John Strege
(74) *Attorney, Agent, or Firm* — Alston & Bird LLP

(57) ABSTRACT

A method for providing face pose estimation for face detection may include utilizing a selected portion of classifiers in detectors to determine coarse pose information for a candidate face in an image, determining fine pose information for the candidate face based at least in part on the determined coarse pose information, and employing another portion of the classifiers in the detectors to perform face detection based at least in part on the fine pose information to determine whether the candidate face corresponds to a face. An apparatus and computer program product corresponding to the method are also provided.

20 Claims, 7 Drawing Sheets

OTHER PUBLICATIONS

*Face Pose Discrimination Using Support Vector Machines (SVM)*, Huang, J. et al., Proceedings of International Conference on Pattern Recognition, 1998, pp. 154-156.

*Real-Time Head Orientation Estimation Using Neural Networks*, Zhao, Z. et al., Proceedings of International Conference on Image Processing, 2002, pp. 297-300.

*Estimating Face Pose by Facial Asymmetry and Geometry*, Hu, Y. et al., Proceeding of International Conference on Automatic Face and Gesture Recognition, 2004, 7 pages.

Office Action from Japanese Patent Application No. 2011-541628, dated Dec. 5, 2012.

Li et al.; "Handbook of Face Recognition, Chapter 2: Face Detection;" dated Jan. 1, 2005; pp. 19-26.

Liu et al.; "Rotated Face Detection in Color Images Using Radial Template (RT);" dated Jul. 6-9, 2003; Proceedings of the 2003 International Conference on Multimedia and Expo; vol. 3;pp. 137-140.

Wu et al.; "Face Rotation Invariant Multi-View Face Detection Based on Real Adaboost;" dated May 17, 2004; Proceedings of the Sixth IEEE International Conference on Automatic Face and Gesture Recognition; pp. 79-84.

European Search Report for Application No. EP-09836139, dated Aug. 8, 2012.

Korean Office Action for Application No. 2011-7017838, dated Aug. 31, 2012.

Russian Federation Office Action for Application No. 2011130626, dated Aug. 24, 2012.

Liu, H., et al.; "Rotated Face Detection in Color Images Using Radial Template (RT);" Proceedings of the 2003 International Conference on Multimedia and Expo; dated 2003; vol. 3; pp. 213-216.

Chinese Office Action for Application No. 200980153322.7; dated Dec. 4, 2012.

Wu, B., et al.; "Fast Rotation Invariant Multi-View Face Detection Based on Real Adaboost;" Proceedings of the Sixth IEEE International Conference on Automatic Face and Gesture Recognition (FGR'04); dated 2004; pp. 1-6.

\* cited by examiner

METHOD, APPARATUS AND COMPUTER PROGRAM PRODUCT FOR PROVIDING FACE POSE ESTIMATION

TECHNOLOGICAL FIELD

Embodiments of the present invention relate generally to image processing technology and, more particularly, relate to a method, apparatus and computer program product for providing face pose estimation.

BACKGROUND

Face detection and recognition is becoming an increasingly more important technology. In this regard, for example, face detection may be useful in biometrics, user interface, gaming and other areas such as creating context for accessing communities in the mobile domain. Face detection may also be important going forward in relation to initiatives such as metadata standardization.

Although face detection techniques continue to improve, many current methods require either a high computation capability (e.g., statistical methods of detecting faces by scanning images in a traversing way on multiple scales) or suffer from limited face detection performance (e.g., structure-based methods with relatively high false alarms of face detection). Furthermore, some statistical face detection mechanisms have degraded performance for multi-view face detection in relation to front face detection. As another complicating issue, faces encountered in a particular image may not always be oriented in the same direction relative to the camera, which could negatively impact face detection. For example, in-plane rotation (e.g., faces that are rotated along the axis from the face to the observer) may complicate face detection in some cases.

Accordingly, the tendency for developing devices with continued increases in their capacity to create content, store content and/or receive content relatively quickly upon request, the trend toward electronic devices (e.g., mobile electronic devices such as mobile phones) becoming increasingly ubiquitous in the modern world, and the drive for continued improvements in interface and access mechanisms to unlock the capabilities of such devices, may make it desirable to provide further improvements in the area of face detection.

BRIEF SUMMARY OF SOME EXAMPLES

A method, apparatus and computer program product are therefore provided to enable an improved face detection mechanism. In this regard, in some exemplary embodiments, a mechanism is provided that is capable of incorporating a fusion of certain aspects of statistical and structural face detection methods in order to realize advantages associated with both, while reducing disadvantages associated therewith. As such, embodiments of the present invention may provide a relatively robust ability for detecting faces even under different conditions (e.g., having different head poses or facial views).

In an exemplary embodiment, a method of providing face pose estimation for use in face detection is provided. The method may include utilizing a selected portion of classifiers in detectors to determine coarse pose information for a candidate face in an image, determining fine pose information for the candidate face based at least in part on the determined coarse pose information, and employing another portion of the classifiers in the detectors to perform face detection based at least in part on the fine pose information to determine whether the candidate face corresponds to a face.

In another exemplary embodiment, a computer program product for providing face pose estimation for use in face detection is provided. The computer program product includes at least one computer-readable storage medium having computer-executable program code instructions stored therein. The computer-executable program code instructions may include program code instructions for utilizing a selected portion of classifiers in detectors to determine coarse pose information for a candidate face in an image, determining fine pose information for the candidate face based at least in part on the determined coarse pose information, and employing another portion of the classifiers in the detectors to perform face detection based at least in part on the fine pose information to determine whether the candidate face corresponds to a face.

In another exemplary embodiment, an apparatus for providing face pose estimation for use in face detection is provided. The apparatus may include a processor. The processor may be configured to utilize a selected portion of classifiers in detectors to determine coarse pose information for a candidate face in an image, determine fine pose information for the candidate face based at least in part on the determined coarse pose information, and employ another portion of the classifiers in the detectors assoc to perform face detection based at least in part on the fine pose information to determine whether the candidate face corresponds to a face.

In yet another exemplary embodiment, an apparatus for providing face pose estimation for use in face detection is provided. The apparatus may include means for utilizing a selected portion of classifiers in detectors to determine coarse pose information for a candidate face in an image, means for determining fine pose information for the candidate face based at least in part on the determined coarse pose information, and means for employing another portion of the classifiers in the detectors to perform face detection based at least in part on the fine pose information to determine whether the candidate face corresponds to a face.

Embodiments of the invention may provide a method, apparatus and computer program product for employment, for example, in mobile or fixed environments. As a result, for example, computing device users may enjoy an improved capability for face detection.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS

Figure 1:
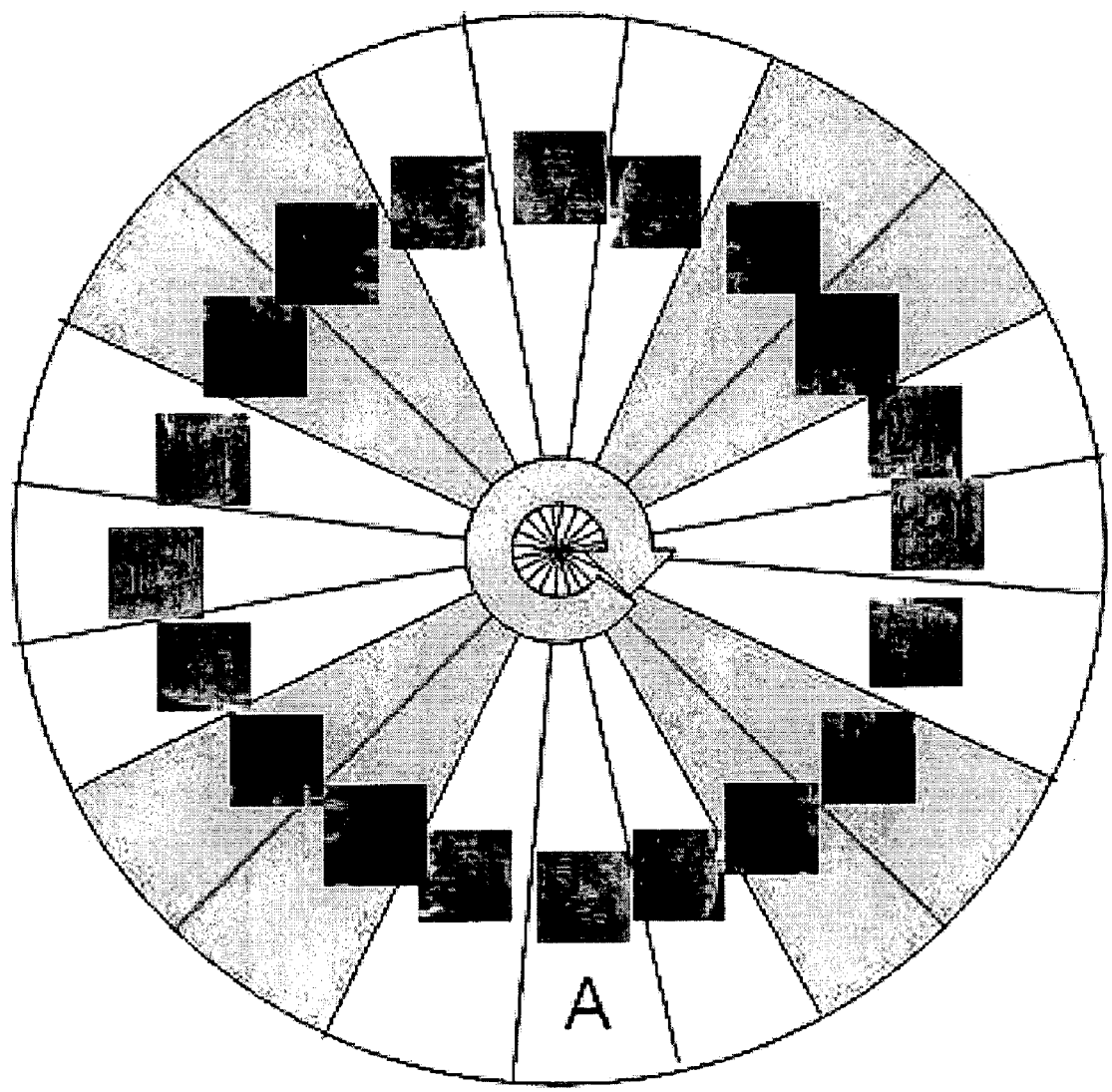
FIG. 1 illustrates an example of a division of a rotation plane into a plurality of sectors according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Additionally, the terms near and far are used herein in the relative sense so as to refer to objects being closer and further from some point with respect to one another, but not to otherwise represent any particular or quantifiable position. Thus, use of any such terms should not be taken to limit the spirit and scope of embodiments of the present invention.

Some embodiments of the present invention may provide a mechanism by which improvements may be experienced in relation to face detection and/or recognition. In this regard, for example, some embodiments may provide for a real-time or near real-time face detection scheme, which may be suitable for metadata assignment, biometrics, gaming, and numerous other activities on hand-held or other computing devices.

For many images taken, the individual or individuals in the image may have various different in-plane and out of plane rotations defining their respective pose or facial view. These rotations defining the poses of faces in the image may complicate face detection and recognition. Two basic categories of responses have been developed for various techniques that deal with these situations. In this regard, a first category includes pose evaluation using multiple trained detectors. For this approach, multiple face detectors are trained given corresponding training sets with various poses. The training sets include a plurality of faces oriented with various different amounts of in-plane and/or out of plane rotations (e.g., various poses). Image patches may then be attempted to be passed through the trained detectors, and the one through which the image patch passes and is recognized as a face, may be indicative of the corresponding pose of the face therein. FIG. 1 shows an example of a division of the rotation plane into 20 sectors. For each sector, a face detector may be trained based on a face with a corresponding pose. As can be seen from FIG. 1, each sector defines a particular in-plane rotation and a particular out of plane rotation. By proceeding around all of the sectors and considering tolerances within each sector, the 20 trained detectors may be able to detect faces having various different poses within an image to provide an estimate of face pose information in a multi-view face detection application or system.

However, one disadvantage of this approach is that the approach only provides a pose scope, and not necessarily precise pose information. In addition, there is a trade-off between the number of sectors and the difficulty of convergence in detector training. For example, sector A of FIG. 1 covers pose variations from −45° to 45° of in plane rotation. Thus, a corresponding training database for providing training examples for training the detector has to include many examples to cover incremental changes within the range, which may lead to difficult convergence in training because of relatively large pattern variations. This disadvantage could be partially solved by increasing the number of sectors in order to make convergence easier. However, increasing the number of sectors (e.g., by doubling) may provide a corresponding increase (e.g., double) in the time consumed for pose evaluation. The increase in time consumption may not be tolerable for a real-time system.

Another category of approaches to multi-view face detection may include pose evaluation by training a pose classifier. In this regard, for an image patch, the pose may initially be estimated by a pose classifier. Then, the image patch is sent to a corresponding face detector of the classified pose to verify whether the image patch includes a face or not. In the example embodiment of FIG. 1, which includes twenty sectors (e.g., sector A), the pose classifier is trained to distinguish the corresponding 20 poses. This approach also only provides a pose scope instead of precise pose. Meanwhile, training a unique pose classifier to distinguish as many as 20 poses can be a difficult task to realize as it relates to a multiple category classification problem, which is a classical difficulty in pattern analysis. In some cases, it may be possible to train 20 pose classifiers and use each one to classify one pose and remaining poses. However, this solution is also potentially time consuming and therefore may not be effectively useful in real-time scenarios.

Accordingly, embodiments of the present invention may be aimed at addressing problems related to difficulty in training convergence, coarse precision or lack of accuracy in pose evaluation, and low time efficiency in pose evaluation. In particular, embodiments of the present invention may provide a unique fusion of structure based and statistical based face detection methods. In this regard, embodiments of the present invention may initially employ coarse pose determination using a statistical method, followed by fine pose determination using a structural method to analyze an image patch for a face. Normalized data (e.g., rotated to verticality) may then be used to analyze for the existence of a face in the image patch (e.g., using another statistical method). Accordingly, some embodiments provide for a fine pose determination prior to performing a pose-based face detection application. Thus, embodiments of the present invention may provide fine pose information with relatively low increase in workload for a face-based application. In general terms, embodiments of the present invention may be referred to as relating to a push-switch based face pose evaluator because information is pushed between two different methods and then a method switch is made to push information back to the original method.

Face detection may be accomplished in some cases using cascaded classifiers forming a detector. In this regard, as shown in the example of FIG. 1, twenty different detectors could be formed by cascading weak classifiers. A weak classifier may be defined as a classifier which is only slightly correlated with the true classification. In contrast, a strong classifier may be a classifier that is arbitrarily well-correlated with the true classification. Weak classifiers may be easier to create than strong classifiers. However, a plurality of weak classifiers may, in some cases, provide results that may be on par with results provided by a strong classifier with less cost.

Figure 2:
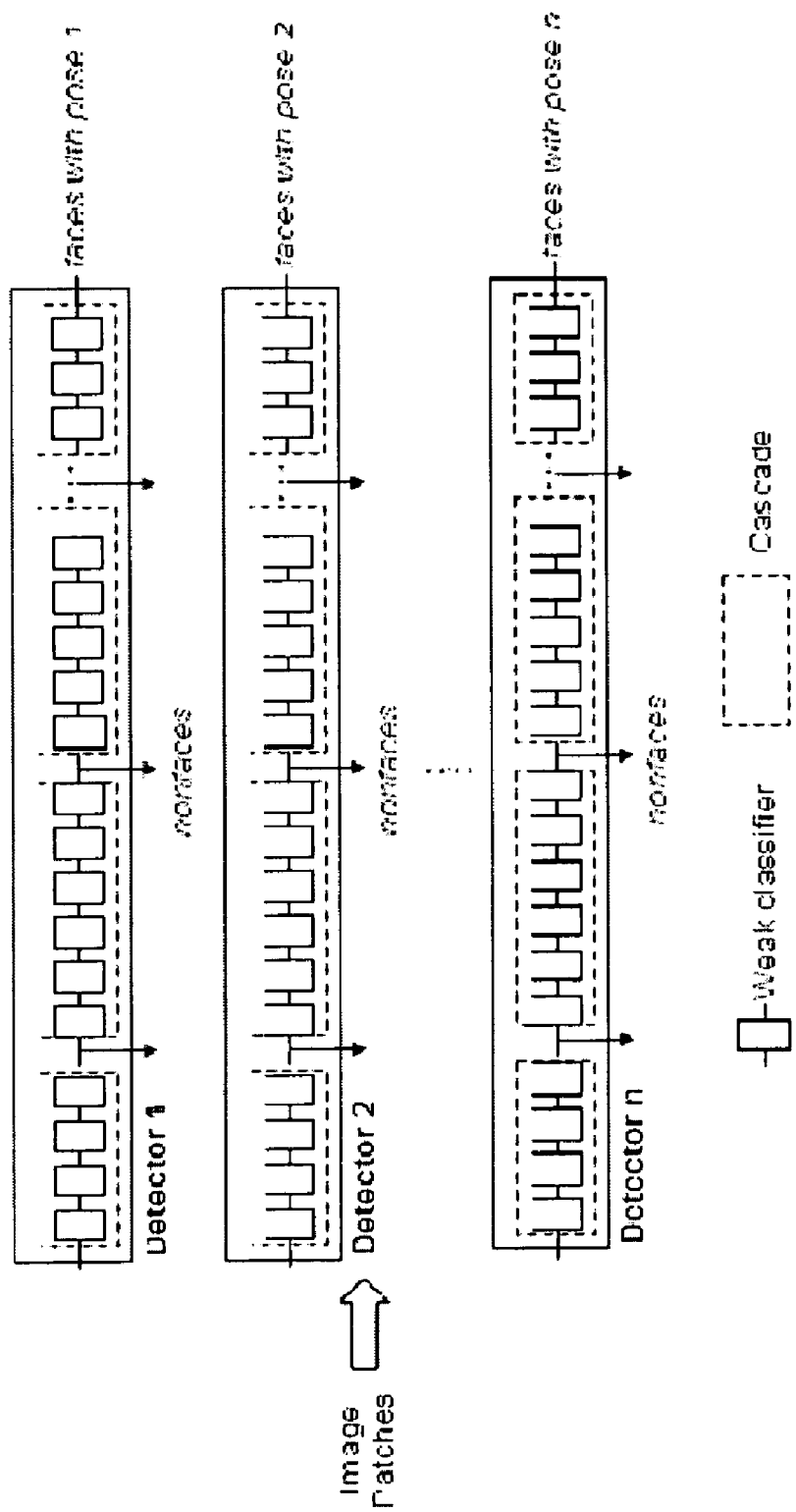
FIG. 2 shows an example of a statistical mechanism for pose evaluation according to an exemplary embodiment of the present invention.

FIG. 2 illustrates a potential mechanism for pose evaluation that could be used in conjunction with the example of FIG. 1. In this regard, n detectors (e.g., 20 detectors in the example of FIG. 1) may be comprised of cascaded sets of weak classifiers trained on faces with a particular pose or range of poses to detect faces having characteristics similar to the corresponding training poses. As such, each detector may be trained for a corresponding particular pose. Thus, for example, if an image patch is passed through detector 1 and results in a face detection, the detected face can be said to have a corresponding pose similar to that associated with the training faces used to train the detector (e.g., pose 1). Meanwhile, if the image patch does not generate a face detection in relation to detector 1, the image patch may still generate a face detection with a corresponding pose for any one or more of the other detectors (e.g., detector 2 to detector n). Therefore, in operation, the image patch may be input into all of the detectors in order to realize a multi-view face detector configured to detect possible faces with various corresponding poses. The pose information for each possible face may be simultaneously determinable based on the detector that detected the face.

Figure 3:
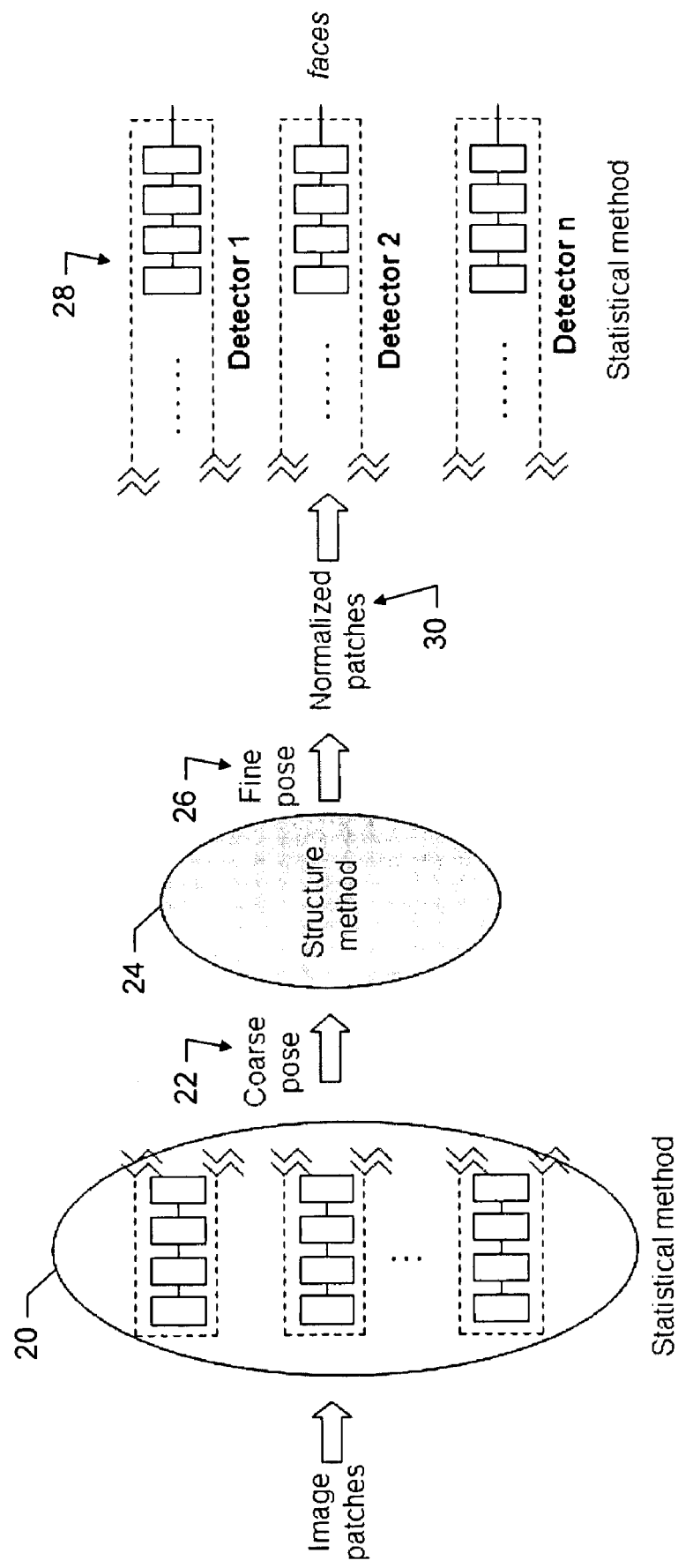
FIG. 3 illustrates one example of a fusion of structural and statistical methods for face detection according to an exemplary embodiment of the present invention.

Since face detection is central to a face-based application, it may be beneficial to initially determine pose information prior to performing face detection. The performance of pose determination may initially be done in a relatively coarse fashion using a statistical method such as the mechanism shown in FIG. 2. Based on the coarse pose information determined, fine pose information may then be accomplished using a structure based method thereby fusing statistical and structural methods. FIG. 3 illustrates one example of a fusion of structural and statistical methods for face detection according to an exemplary embodiment. In this regard, as shown in FIG. 3, a statistical method 20 of pose evaluation (e.g., similar to the initial stages shown in FIG. 2) may be performed by several detectors that each comprise a cascaded series of weak classifiers in which each detector corresponds to a particular range of poses (e.g., covering a predetermined range of out of plane rotation angles and/or in-plane rotation angles). As a result of passing an image patch through the statistical method 20, coarse pose information 22 may be passed through a structural method 24 to get fine pose information 26. After normalizing the patches, a statistical method 28 (e.g., similar to the remaining stages or portions from the embodiment of FIG. 2) may be employed on the normalized patches 30 to provide a face detection output 32 that may be relatively accurate and robust without greatly increasing overhead costs.

A characteristic aspect of the embodiment shown in FIG. 3 relates to the combination of detectors comprising several weak classifiers with a structure-based method to form a pose evaluator. Thus, an embodiment of the present invention could be realized by employing the initial stage or stages of the statistical method of FIG. 2 for coarse pose determination and then employing a structural method to perform fine pose determination. Some or all of the remaining weak classifiers of the statistical method for face detection may then be used for corresponding face detection in each respective detector. However, separate generic statistical methods could be used for the respective operations associated with the statistical method 20 and the statistical method 28 of FIG. 3 instead of using portions of the statistical method shown in FIG. 2 as shown in FIG. 4.

Figure 4:
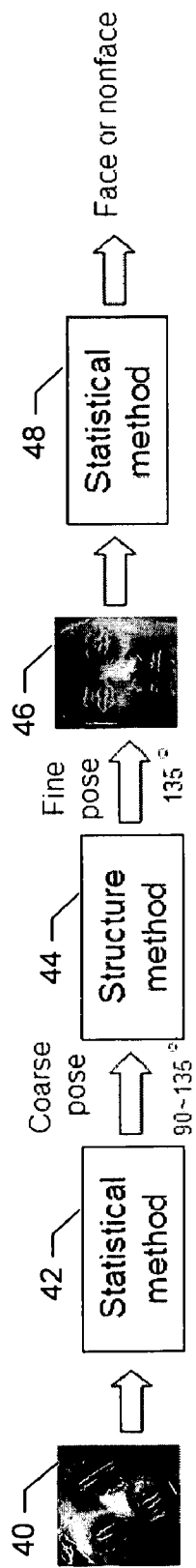
FIG. 4 shows a block diagram illustrating one example of a fusion of structural and statistical methods for face detection according to an exemplary embodiment of the present invention.

FIG. 4 shows a block diagram of the example described in reference to FIG. 3 with an example image patch. In this regard, the image patch 40 may be analyzed for coarse pose determination using statistical method 42. For example, a coarse pose determination may be achieved indicating a pose with between about 90 and 135 degrees of in-plane rotation and approximately no out of plane rotation. A structural method 44 may then be employed to obtain a fine pose determination of 135 degrees of in-plane rotation and no out of plane rotation. The image patch 46 may then be rotated to verticality for normalization and another statistical method 48 (or a portion of the same statistical method) may be employed for face detection. As can be seen from FIGS. 2-4, embodiments of the present invention may perform face detection for face-based applications without requiring a separate pose classifier. Accordingly, time efficiency of exemplary embodiments of the present invention may be increased relative to existing methods.

Figure 5:
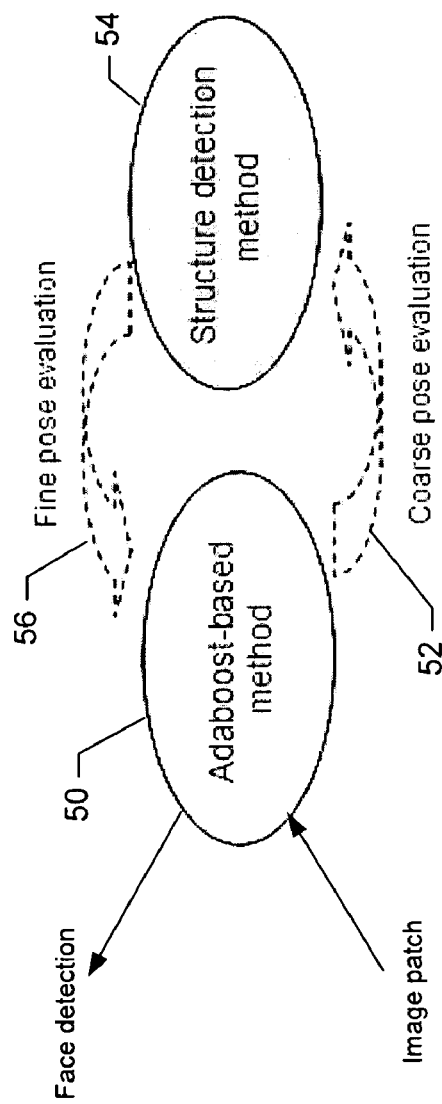
FIG. 5 illustrates an example of a push-switch based pose estimator in accordance with an exemplary embodiment of the present invention.

FIG. 5 illustrates an example of a push-switch based pose estimator in accordance with an exemplary embodiment of the present invention. In this regard, as shown in FIG. 5, for a given image patch, a statistical-based method (e.g., Adaboost (adaptive boosting) based statistical method 50 as described in reference to FIG. 3 above) may initially be employed for coarse pose estimation 52. The coarse pose estimation 52 may be provided to a structure based detection method 54 to result in a fine pose evaluation 56. The patch may be rotated to verticality by the structure based scheme and pushed back to the Adaboost based statistical method 50 for face detection, recognition, etc.

As indicated above, Adaboost may be an example of a statistical method that may be employed in connection with embodiments of the present invention. Other examples of statistical methods may include Gentle-Boost, RealBoost, FloatBoost, and/or the like. Meanwhile, exemplary structural methods may include employment of detectors in various different orientations that provide for coverage of respective different in-plane rotation angles, and employment of a series of differently oriented facial templates against which features of an image may be compared. In some cases, a result of employment of structure based scheme may be that the image patch analyzed is rotated to verticality.

Figure 6:
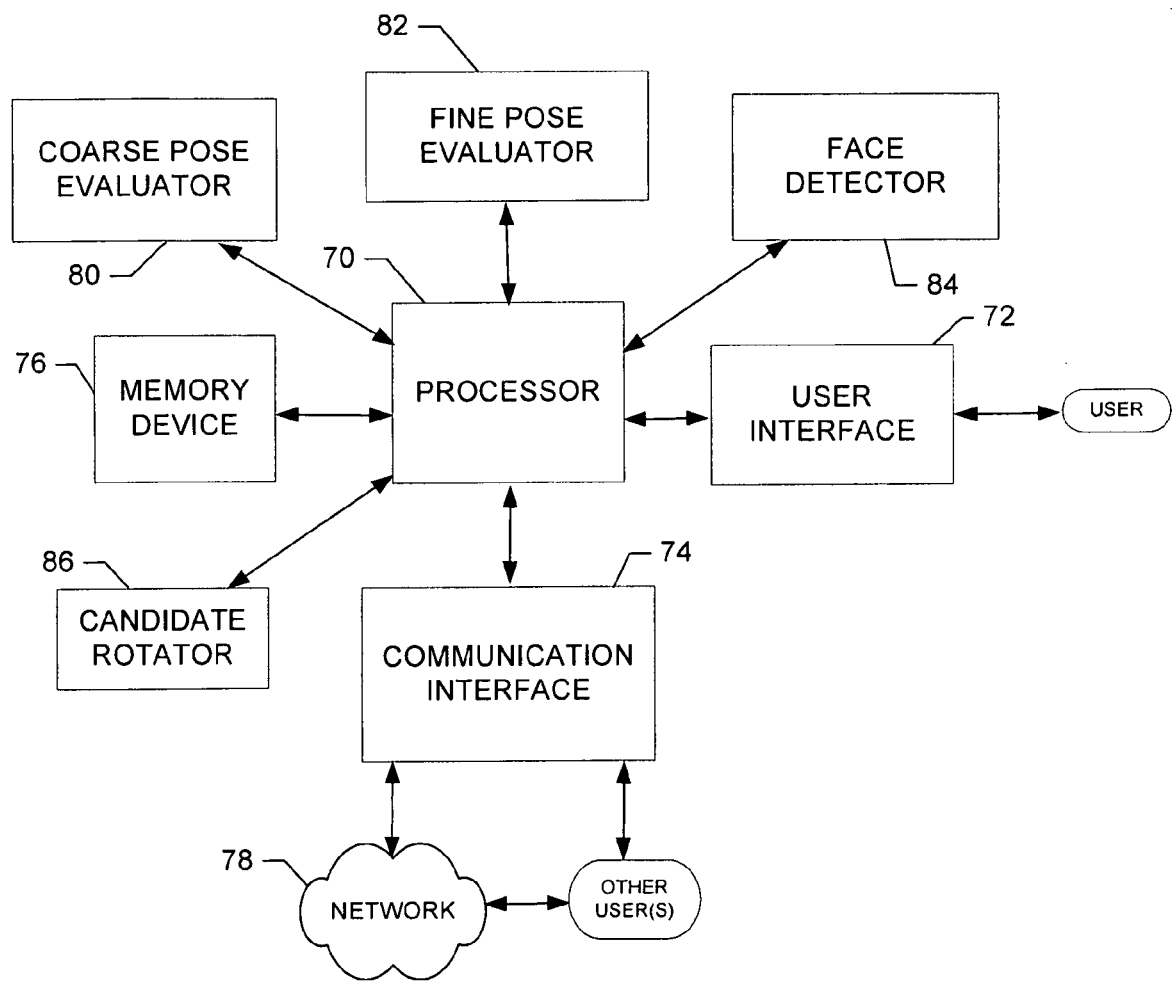
FIG. 6 illustrates a block diagram of an apparatus for providing face pose estimation according to an exemplary embodiment of the present invention.

FIG. 6 illustrates one example of a schematic block diagram of an apparatus for enabling face pose estimation for face detection according to an exemplary embodiment of the present invention. An exemplary embodiment of the invention will now be described with reference to FIG. 6, in which certain elements of an apparatus for enabling face pose estimation for face detection are displayed. The apparatus of FIG. 6 may be employed, for example, on a mobile terminal (e.g., a mobile phone, gaming device, personal digital assistant (PDA) and/or the like) or a variety of other devices, both mobile and fixed (such as, for example, a network device, personal computer, laptop computer, digital camera, or the like). Alternatively, embodiments may be employed on a combination of devices. Accordingly, some embodiments of the present invention may be embodied wholly at a single device or by devices in a client/server relationship. Furthermore, it should be noted that the devices or elements described below may not be mandatory and thus some may be omitted in certain embodiments.

Referring now to FIG. 6, an apparatus for enabling face pose estimation for face detection is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly. Accordingly, when the processor 70 is embodied as an ASIC, FPGA or the like, the processor 70 may be specifically configured hardware for conducting the operations described herein. Alternatively, when the processor 70 is embodied as an executor of software instructions, the instructions may specifically configure the processor 70, which may otherwise be a general purpose processing element, to perform the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network (e.g., network 78). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal or personal computer, the user interface 72 may include, among other devices or elements, any or all of a speaker, a microphone, a display, and a keyboard or the like.

In an exemplary embodiment, the processor 70 may be embodied as, include or otherwise control a coarse pose evaluator 80, a fine pose evaluator 82, a face detector 84, and in some cases also a candidate rotator 86. However, the candidate rotator 86 may be a portion of the fine pose evaluator 82 in some instances. The coarse pose evaluator 80, the fine pose evaluator 82, the face detector 84, and the candidate rotator 86 may each be any means such as a device or circuitry embodied in hardware, software or a combination of hardware and software (e.g., processor 70 operating under software control, the processor 70 embodied as an ASIC or FPGA specifically configured to perform the operations described herein, or a combination thereof) that is configured to perform the corresponding functions of the coarse pose evaluator 80, the fine pose evaluator 82, the face detector 84, and the candidate rotator 86, respectively, as described below.

In an exemplary embodiment, any or all of the coarse pose evaluator 80, the fine pose evaluator 82, the face detector 84, and the candidate rotator 86 may include instructions, code, modules, applications and/or circuitry for providing respective portions of face detection services. However, it should be noted that code, circuitry and/or instructions associated with the coarse pose evaluator 80, the fine pose evaluator 82, the face detector 84, and the candidate rotator 86 need not necessarily be modular. Moreover, as discussed below, in some cases, the coarse pose evaluator 80 and the face detector 84 may each implement portions of the same statistical based method or scheme (e.g., including a series of cascaded detectors) and in some cases the implemented portions may overlap. In some embodiments, communication between the coarse pose evaluator 80, the fine pose evaluator 82, the face detector 84, and the candidate rotator 86 is conducted via the processor 70. However, the coarse pose evaluator 80, the fine pose evaluator 82, the face detector 84, and the candidate rotator 86 are alternatively in direct communication with each other or may have no communication with each other in other embodiments.

In an exemplary embodiment, the coarse pose evaluator 80 employs a series of trained detectors of a confidence based or statistical based method of face detection for determining an estimate of the pose of any identified face within a particular image patch. The coarse pose evaluator 80, however, does not implement all of the classifiers of the detectors of the statistical based method. Instead, only a selected number of the classifiers may be employed to get a rough estimate of pose in a relatively short time due to the avoidance of using all of the classifiers of the detectors.

Given an image patch for a face related application, a typical trained detector could be used to determine whether the image patch included a face. However, given the number of trained detectors in a typical statistical based method scheme and the corresponding number of trained classifiers therein, time efficiency may be low if the image patch is analyzed using all of the classifiers. Accordingly, embodiments of the present invention may utilize less than the full complement of trained classifiers for pose determination in combination with a structural method to refine the pose information determined by the trained classifiers of the statistical method that are employed. Thus, the coarse pose evaluator 80 may be configured to quickly perform coarse pose evaluation to enable improved real-time performance by improving detection speed.

The coarse pose evaluator 80 may be configured to employ data used for training that includes relatively small pose variations. Even though relatively small pose variations are shown in the training data, given a face beyond the training scope, the probability of correctly classifying the given face with respect to its corresponding pose is relatively high since similarities between the training data and evaluated face are highest in both appearance and structure.

An exemplary statistical based method may include a plurality of detectors in which each detector is a trained detector $D_n = \{C_1, C_2, \ldots, C_m\}$ with m cascades, where $C_i = \{W_1, W_2, \ldots, W_t\}$ is the ith cascade with t weak classifiers. In some embodiments, the number of weak classifiers in each detector is more than 1,000. Each weak classifier would typically contribute a confidence score of indicating the degree to which the testing image patch is likely to be a face with the pose associated with the corresponding classifier. As an example, for a Gentle-Boost statistical method, the definition of $W_i$ may be:

$$W_i = \frac{P_+ - P_-}{P_+ + P_-} \quad (1)$$

where $P_+$ and $P_-$ are positive probability and negative probability in a partition area. It can be further written as:

$$W_i = \frac{P_+}{P_+ + P_-} - \frac{P_-}{P_+ + P_-} \quad (2)$$

So $W_i$ is actually a normalized score to measure, in a particular partition, which probability is more dominant. If the confidence score is large, it is more likely that the image patch being analyzed includes a face with the pose associated with the corresponding classifier. Each weak classifier $W_{ji}$ in detector $D_j$ contributes a score, and the scores are fused with a rule (e.g., the summation rule below) to produce a reliable confidence score:

$$\overline{W_j} = \frac{\sum_i W_{ji}}{N} \quad (3)$$

where N is the number of weak classifier used for pose evaluation. Thus, a pose of image patch I may be determined by:

$$\text{Pos}(I) = \arg\max(\overline{W_j}). \quad (4)$$

By implementing only N weak classifiers (e.g., 6 in one example) a pose may be determined by utilizing a fraction of the weak classifiers of each trained detector (e.g., only the first 6 weak classifiers in one example) for pose estimation. Thus, it is not necessary to train an extra pose classifier and still relatively fast performance can be achieved. Accordingly, the coarse pose evaluator 80 is configured to implement a selected portion of the classifiers for each detector of a statistical based analysis scheme in order to obtain confidence scores used to achieve relatively good (albeit coarse) pose evaluation performance.

Figure 7:
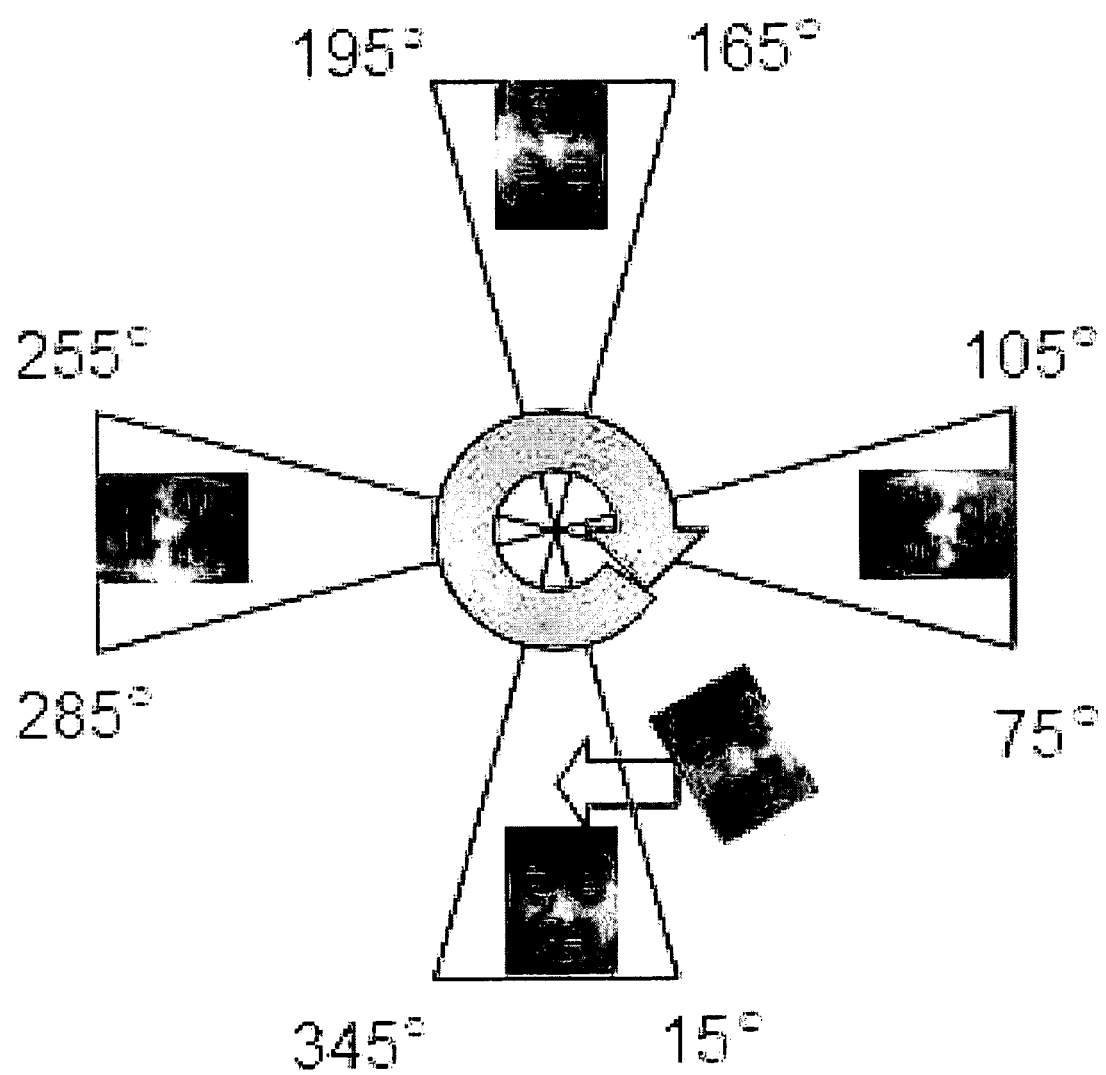
FIG. 7 shows an example of coarse pose evaluation that may be accomplished using a coarse pose evaluator in connection with an exemplary embodiment of the present invention.

FIG. 7 shows an example of coarse pose evaluation that may be accomplished using the coarse pose evaluator 80. Notably, as shown in FIG. 7, in some embodiments convergence performance may be increased at least in part by enabling a reduction in the coverage range of the detectors. For example, sector A in FIG. 1 covered from −45 to 45 degrees of in-plane rotation, which may require a relatively large amount of training data to enable reliable pose detection and face detection over such a range. Meanwhile, in an exemplary embodiment of the present invention, the coverage range may be reduced to −15 to 15 degrees of in-plane rotation because rotated faces can be calibrated by a structural method by the fine pose evaluator 82 (thus the rotation of the face indicated outside the −15 to 15 degrees coverage area to within the −15 to 15 degrees coverage area may be accomplished by the structural method). Thus, it is not necessary for trained detectors in accordance with embodiments of the present invention to have the capability to detect large rotations of faces. In practice, the coarse pose evaluator 80 may therefore implement less classifiers in each detector (e.g., N may be smaller).

The fine pose evaluator 82 may be configured to implement a structure based analysis scheme to provide fine pose information including a relatively accurate indication of the pose of any face detected in a particular image patch. The structure based analysis scheme may be one of the examples described above or any other structure based analysis scheme. Though some embodiments may estimate coarse pose information using the statistical scheme, utilizing the structure based scheme may enable refinement of the coarse pose information. In this regard, for example, if the face has a relatively large rotation, the face may not have a high likelihood of being correctly classified by using only the statistical based method employed by the coarse pose evaluator 80 (e.g., by classifiers of the detector associated with a corresponding pose), because for ensuring good convergence, only small pose variations are generally permitted in training data. Accordingly, embodiments of the present invention utilize the structure based analysis scheme to get fine pose information. In some embodiments, the face may be rotated to verticality to enable face detection. In some cases, the rotation to verticality may be accomplished by the candidate rotator 86 either before or after operation of the fine pose evaluator 82 in determining a relatively accurate pose to define pose information for the corresponding face candidate. By vertically aligning the face candidate, the structural method may be better enabled to analyze structural features of the image patch to determine accurate pose information.

The face detector 84 may be configured to detect face candidates in a vertically aligned image patch with a fine pose determination already made using the statistical based analysis scheme used by the coarse pose evaluator 80. In some cases, the face detector 84 may use all or a portion of the remaining cascaded weak classifiers not initially used by the coarse pose evaluator 80. However, in other cases, an unrelated set of detectors employing a statistical method may be employed. In operation, after candidate faces have been detected, the candidate rotator 86 may rotate the detected candidates to vertical after which the face detector 84 may more easily and quickly determine whether the candidates correspond to faces. In an exemplary embodiment, the apparatus of FIG. 6 may be in communication with a media capturing module (e.g., a camera) to receive image data for use in analysis as described herein. However, in alternative embodiments, the apparatus of FIG. 6 may receive images from a storage location (e.g., the memory device 76) or another device.

As indicated above, in some embodiments, the coarse pose evaluator 80 and the face detector 84 may utilize Adaboost or another statistical based analysis scheme. However, Adaboost is merely one example of a specific implementation of the coarse pose evaluator 80 and the face detector 84 and other mechanisms may alternatively be employed. Adaboost (adaptive boost) is a machine learning algorithm that may be utilized in conjunction with other learning mechanisms to improve performance. In an exemplary embodiment, Adaboost may be used in conjunction with a structure based analysis scheme for pose evaluation. Then, after determining coarse pose information using selected classifiers from the detectors associated with Adaboost that have been trained using face datasets with relatively small pose variations, the structure based analysis scheme may refine the pose information to provide fine pose information and rotate the corresponding image patch to verticality. Other Adaboost classifiers may then be employed to complete face detection on the vertically rotated image.

The vertical rotation of the image by the structure based analysis scheme may make it unnecessary for training data with large rotation angles to be utilized by the statistical based analysis scheme. Thus, less weak classifiers may need to be trained in each detector and detectors may achieve convergence more rapidly. According to some embodiments in which coarse pose information is initially acquired using a statistical based analysis scheme, search scope of the structure based analysis scheme is refined for finding a precise rotation angle. Thus, based on the size of an input image patch, appropriate operators may be constructed to better estimate structure information to improve efficiency of the structure based analysis scheme. Moreover, some embodiments of the present invention fuse statistical and structure based analysis schemes for the determination of pose information to augment face detection.

Embodiments of the present invention may, in some cases, decrease time needed to accomplish pose estimation relatively accurately without appending extra computational load in face based applications. In this regard, a push-switch based face pose evaluator as described herein fuses both statistical and structure based analysis schemes for reliable pose estimation. Thus, for example, convergence performance in detector training may be improved, pose estimates may be quickly and accurately determined, and does so without requiring an extra pose classifier to train.

In some cases, the structure based analysis scheme employed by the fine pose evaluator 82 may utilize eye positioning for fine pose information determination. As such, fine pose information may not be determinable for certain face rotations where the eyes are not visible. In such situations, only coarse pose information may be provided.

Embodiments of the present invention may be utilized in connection with multi-view face detection and recognition and also in connection with human-computer interface (HCI) applications in order to provide a user interface for mobile phone operation, gaming, and carrying out tasks using computers.

Figure 8:
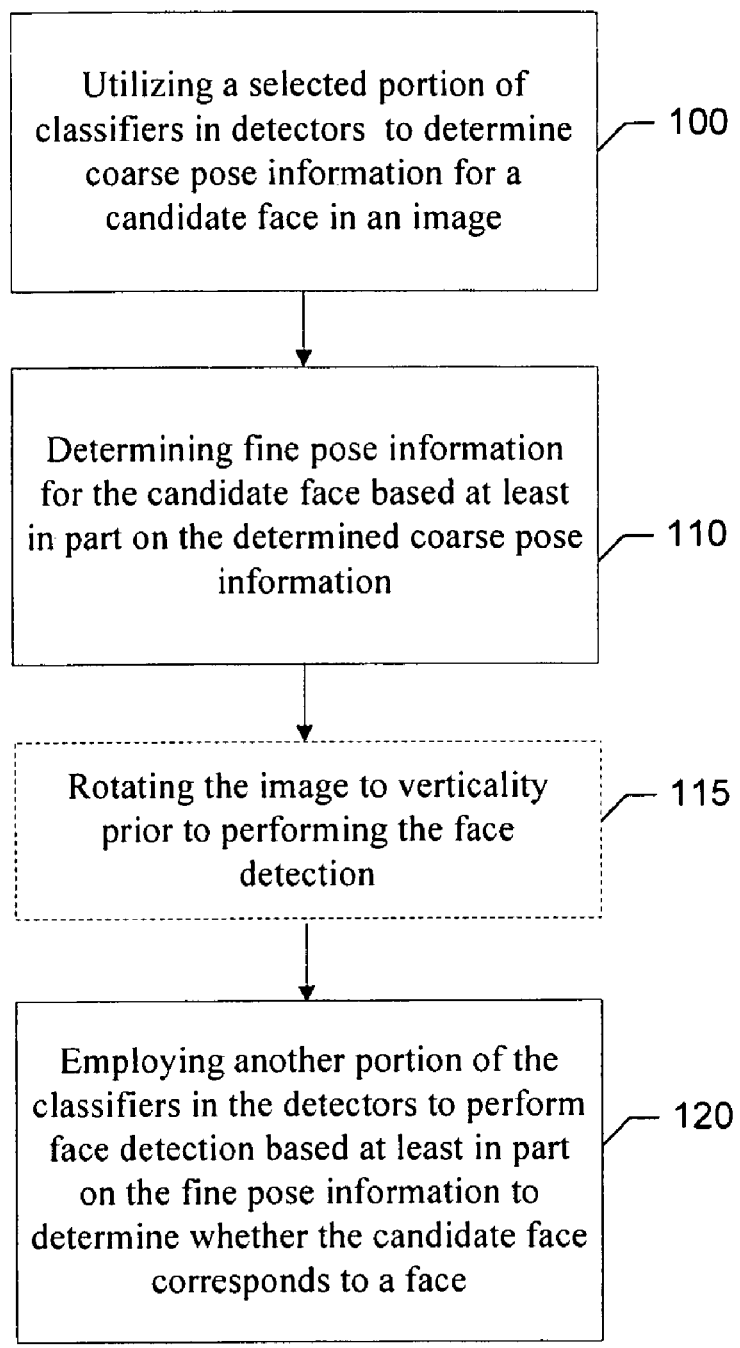
FIG. 8 is a flowchart according to an exemplary method for providing face pose estimation for use in face detection according to an exemplary embodiment of the present invention.

FIG. 8 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing pose evaluation for face detection as illustrated, for example, in FIG. 8 may include utilizing a selected portion of classifiers in detectors (e.g., associated with a statistical based analysis scheme) to determine coarse pose information for a candidate face in an image at operation 100. The method may further include determining fine pose information for the candidate face (e.g., by employing a structure based analysis scheme) based at least in part on the determined coarse pose information at operation 110 and employing another portion of the classifiers in the detectors (e.g., associated with the statistical based analysis scheme) to perform face detection based at least in part on the fine pose information to determine whether the candidate face corresponds to a face at operation 120.

In some embodiments, the method may include further optional operations, an example of which is shown in dashed lines in FIG. 8. Optional operations may be performed in any order and/or in combination with each other in various alternative embodiments. As such, the method may further include an operation of rotating the image to verticality prior to performing the face detection at operation 115.

In some embodiments, certain ones of the operations above may be modified or further amplified as described below. It should be appreciated that each of the modifications or amplifications below may be included with the operations above either alone or in combination with any others among the features described herein. In this regard, for example, determining fine pose information for the candidate face by employing the structure based analysis scheme comprises utilizing a face template. In some cases, the statistical based analysis scheme may be Adaboost. In an exemplary embodiment, utilizing the selected portion of classifiers may include utilizing N number of initial classifiers in the detectors of the statistical based analysis scheme. Alternatively or additionally, employing another portion of the statistical based analysis scheme may include utilizing at least a portion of remaining classifiers not used for determining the coarse pose information.

In an exemplary embodiment, an apparatus for performing the method of FIG. 8 above may comprise a processor (e.g., the processor 70) configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-120 may comprise, for example, the processor 70, coarse pose evaluator 80, the fine pose evaluator 82, the face detector 84, the candidate rotator 86, and/or an algorithm executed by the processor 70 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   a processor; and
   a memory including computer program code, the memory and the computer code configured to, with the processor, cause the apparatus to at least:
   utilize a selected portion of classifiers in detectors to determine coarse pose information for a candidate face in an image;
   determine fine pose information for the candidate face based at least in part on the determined coarse pose information; and
   employ another portion of the classifiers in the detectors to perform face detection based at least in part on the fine pose information to determine whether the candidate face corresponds to a face.

2. The apparatus of claim 1, wherein the memory including the computer program code is further configured to, with the processor, cause the apparatus to cause the image to be rotated verticality prior to performing the face detection.

3. The apparatus of claim 1, wherein the memory including the computer program code is further configured to, with the processor, cause the apparatus to employ adaptive boosting as a statistical based analysis scheme employed by the detectors.

4. The apparatus of claim 1, wherein the memory including the computer program code is further configured to, with the processor, cause the apparatus to determine fine pose information for the candidate face by utilizing a face template.

5. The apparatus of claim 1, wherein the memory including the computer program code is further configured to, with the processor, cause the apparatus to utilize the selected portion of classifiers by utilizing N number of initial classifiers in the detectors of a statistical based analysis scheme.

6. The apparatus of claim 1, wherein the memory including the computer program code is further configured to, with the processor, cause the apparatus to employ another portion of the classifiers by utilizing at least a portion of remaining classifiers not used for determining the coarse pose information.

7. The apparatus of claim 1, wherein the apparatus comprises a mobile terminal.

8. The apparatus of claim 1, wherein the memory including the computer program code is further configured to, with the processor, cause the apparatus to conduct face recognition with respect to the face.

9. A method comprising:
   utilizing a selected portion of classifiers in detectors to determine coarse pose information for a candidate face in an image;
   determining fine pose information for the candidate face based at least in part on the determined coarse pose information; and
   employing another portion of the classifiers in the detectors to perform face detection based at least in part on the fine pose information to determine whether the candidate face corresponds to a face.

10. The method of claim 9, further comprising rotating the image to verticality prior to performing the face detection.

11. The method of claim 9, wherein determining fine pose information for the candidate face comprises utilizing a face template.

12. The method of claim 9, wherein utilizing the selected portion of classifiers comprises utilizing N number of initial classifiers in the detectors of a statistical based analysis scheme.

13. The method of claim 9, wherein employing another portion of the classifiers comprises utilizing at least a portion of remaining classifiers not used for determining the coarse pose information.

14. A computer program product comprising at least one computer-readable non-transitory storage medium having computer-executable program code instructions stored therein, the computer-executable program code instructions comprising:
   program code instructions for utilizing a selected portion of classifiers in detectors to determine coarse pose information for a candidate face in an image;
   program code instructions for determining fine pose information for the candidate face based at least in part on the determined coarse pose information; and
   program code instructions for employing another portion of the classifiers in the detectors to perform face detection based at least in part on the fine pose information to determine whether the candidate face corresponds to a face.

15. The computer program product of claim 14, further comprising program code instructions for rotating the image to verticality prior to performing the face detection.

16. The computer program product of claim 14, wherein program code instructions for determining fine pose information for the candidate face include instructions for utilizing a face template.

17. The computer program product of claim 14, wherein program code instructions for utilizing the selected portion of classifiers include instructions for utilizing N number of initial classifiers in the detectors of a statistical based analysis scheme.

18. The computer program product of claim 14, wherein program code instructions for employing another portion of the classifiers include instructions for utilizing at least a portion of remaining classifiers not used for determining the coarse pose information.

19. An apparatus comprising:
    means for utilizing a selected portion of classifiers in detectors to determine coarse pose information for a candidate face in an image;
    means for determining fine pose information for the candidate face based at least in part on the determined coarse pose information; and
    means for employing another portion of the classifiers in the detectors to perform face detection based at least in part on the fine pose information to determine whether the candidate face corresponds to a face.

20. The apparatus of claim 19, further comprising means for rotating the image to verticality prior to performing the face detection.

* * * * *